United States Patent Office 3,345,192
Patented Oct. 3, 1967

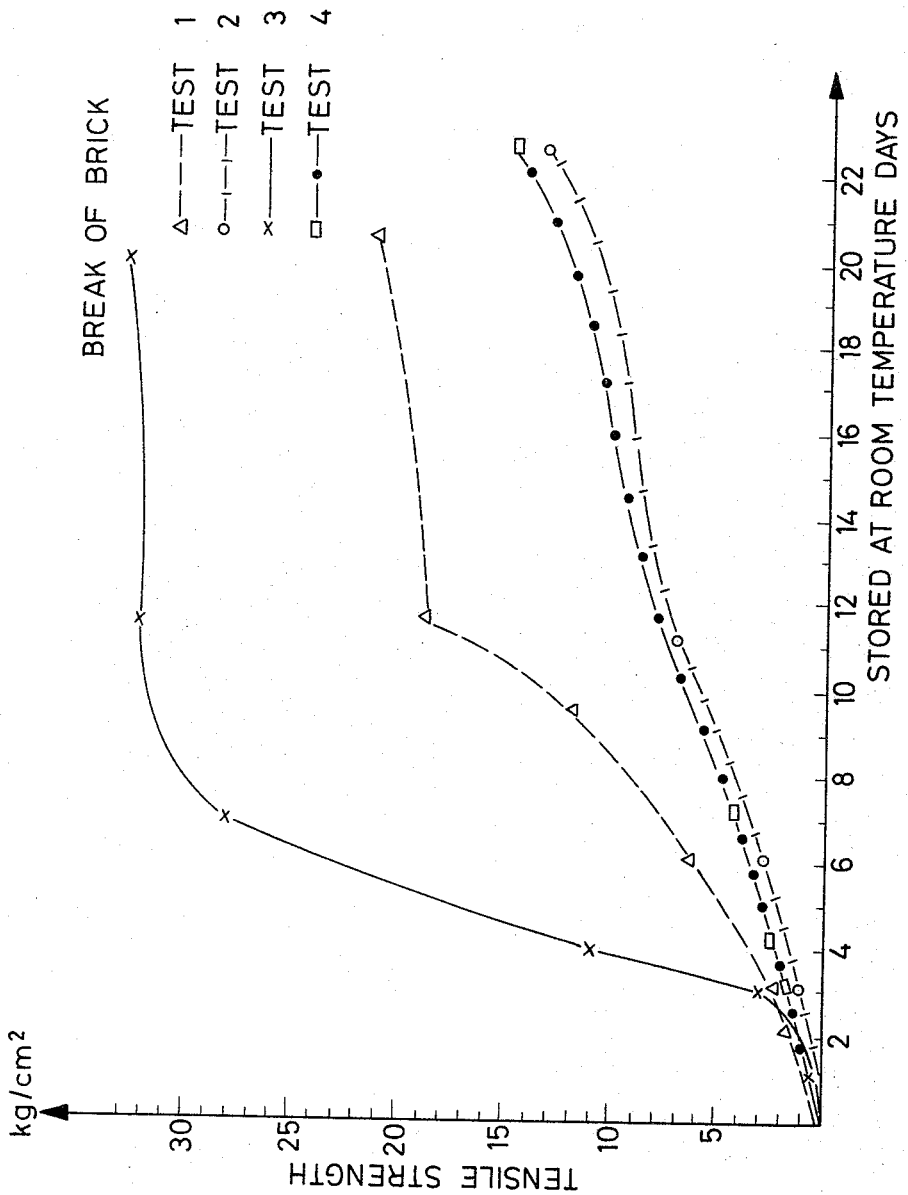
INVENTORS
ALBERT HLOCH
RUDOLF KOHLHAAS
NIKOLAJ MEDIC
HELMUT NEISES
BY Curtis, Morris & Safford
ATTORNEYS

3,345,192
REFRACTORY MASSES
Albert Hloch and Rudolf Kohlhaas, Frankfurt am Main, and Nikolaj Medić and Helmut Neises, Kelkheim, Taunus, Germany, assignors to Farbwerke Hoechst Aktiengesellschaft vormals Meister Lucius & Bruning, Frankfurt am Main, Germany, a corporation of Germany
Filed Nov. 16, 1965, Ser. No. 508,101
Claims priority, application Germany, Dec. 9, 1964, F 44,648
2 Claims. (Cl. 106—67)

ABSTRACT OF THE DISCLOSURE

A refractory mass comprised of an inert filler (such as chamotte) ball clay, alumina hydrate and polyphosphoric acid is improved by adding to it aluminum fluoride. Thus modified, the refractory mass exhibits improved green strength as well as a reduced setting time. These properties are obtained as a result of the coaction of aluminum fluoride with the other components of the refractory mass, e.g., polyphosphoric acid.

---

The present invention relates to refractory masses having an improved green strength and a reduced setting time.

As cements, mortars and ramming masses for fireproof linings and masonry there are increasingly used masses comprising a high melting filler, for example chamotte, a reactive aluminum compound, for example, mullite, corundum, bauxite, hydrargillite or kaolin, and a solution of an acid aluminum phosphate, the acid aluminum phosphate producing setting of the masses by reacting with the reactive aluminum compound. Such masses are distinguished by a high refractoriness and can be exposed in continuous service to temperatures of up to about 1600° C., depending on the refractoriness of the filler. They suffer, however from a poor green strength and long setting time which render it difficult to work without interruption, for example, when lining furnaces. By adding water-soluble fluorides, especially ammonium fluoride, the setting time can be reduced whereby, however, the mechanical properties are impaired.

Now we have found that refractory masses comprising a high melting filler, a reactive aluminum compound and an acid binder which have a reduced setting time and an improved green strength can be obtained by using, as binder, 3 to 15% by weight, advantageously 6 to 8% by weight, of polyphosphoric acid containing at least 80% of $P_2O_5$ the percentage figures being calculated on the total mass. The ratio of reactive alumnium compound to polyphosphoric acid should be such that the ratio of the $Al_2O_3$ content of the reactive aluminum compound to the $P_2O_5$ content of the mixture of these components be within the range of 1:1.5 to 1:4.

The green strength can be further increased, without the mechanical properties of the refractory masses being impaired, by using a mixture of a gel of hydrate of alumina and aluminum fluoride as reactive aluminum compound. The total content of aluminum fluoride in the refractory mass comprising a high melting filler, a reactive aluminum compound and polyphosphoric acid, shall not exceed 3% of $AlF_3$.

The improving effect of the addition of aluminum fluoride to the refractory masses in accordance with the invention is particularly surprising since the known additions of fluoride impaired the mechanical properties and since an addition of aluminum fluoride to the conventional refractory masses hardly improves the green strength.

As reactive aluminum compounds there may advantageously be used the well known gels of hydrate of alumina. They are generally used in admixture with ball clays which must in part also be regarded as reactive aluminum compounds.

The following exampes serve to illustrate the invention but they are not intended to limit it thereto.

Examples

The test mixtures were made from the following materials: chamotte powder ($Al_2O_3$ content 40 to 41%, grain size max. 0.3 mm.), ball clay (Geisenheim) 17% of $Al_2O_3$, gel of hydrate of alumina ($H_2SO_4$) 49% of $Al_2O_3$, polyphosphoric acid (84% of $P_2O_5$), $AlF_3.3H_2O$, commercial quality.

Refractory mortar mixtures, one of each two containing ortho-phosphoric acid and the other containing polyphosphoric acid, as binder, were compared with regard to their green strength and setting time. Care was taken that the relative amount of $P_2O_5$ and $Al_2O_3$ and also the ratio $Al_2O_3:P_2O_5$ were the same in each two mixtures.

The following table indicates the composition of refractory mortar with orthophosphoric acid (58% of $P_2O_5$) according to Tests Nos. 2, 4, 6 and 8 and that of refractory mortar with polyphosphoric acid (84% of $P_2O_5$) according to Tests Nos. 1, 3, 5 and 7. The strength values of test samples 1–4 are shown by the accompanying graph. It is evident from the graph that the mortar masses obtained with polyphosphoric acid are superior with regard to their green strength which increases so strongly, particularly in the presence of $AlF_3$, that rupture in many cases occurs in the test brick and not in the mortar layer.

TABLE

| Composition | Test 1, percent | Test 2, percent | Test 3, percent | Test 4, percent | Extremely low $P_2O_5$ content | | Extremely high $P_2O_5$ content | |
|---|---|---|---|---|---|---|---|---|
| | | | | | Test 5, percent | Test 6, percent | Test 7, percent | Test 8, percent |
| Phosphoric acid, 58% $P_2O_5$ | | 8.5 | | 11.5 | | 4.5 | | 22.0 |
| Polyphosphoric acid, 84% $P_2O_5$ | 6.0 | | 8.0 | | 3.0 | | 15.0 | |
| Gel of hydrate of alumina 49% $Al_2O_3$ | 2.5 | 2.5 | 3.5 | 3.5 | 1.5 | 1.5 | 7.0 | 7.0 |
| Aluminum fluoride $AlF_3.3H_2O$ | | | 2.0 | 2.0 | 0.5 | 0.5 | 3.0 | 3.0 |
| Geisenheim clay | 20 | 20 | 15 | 15 | 15 | 15 | 15 | 15 |
| Chamotte | 71.5 | 69.0 | 71.5 | 68 | 80 | 78.5 | 60 | 53 |
| Green tensile strength in kg./cm.²: | | | | | | | | |
| After 1 week | 7 | 3 | 28 | 4 | 10 | 4 | 1.2 | <0.5 |
| After 2 weeks | 19 | 8 | 30 | 9 | 11 | 4.5 | 1.5 | 0.5 |
| After 3 weeks | 21 | 13 | 30 | 14 | 13 | 7 | 3.5 | 1 |

Test samples Nos. 1 and 2, Nos. 3 and 4, Nos. 5 and 6, and Nos. 7 and 8, respectively, have the same contents of $P_2O_5$.

We claim:
1. A refractory mass consisting essentially of 60 to 80% by weight of an inert refractory filler, 15 to 20% by weight of ball clay, 1.5 to 7% by weight of alumina hydrate, 3 to 15% by weight of polyphosphoric acid containing at least 80% of $P_2O_5$ and 0.5 to 3.0% by weight of aluminum fluoride.

2. A refractory mass according to claim 1 wherein the polyphosphoric acid is from 6 to 8% by weight.

References Cited

UNITED STATES PATENTS

| | | | |
|---|---|---|---|
| 2,630,616 | 3/1953 | Robinson | 106—65 |
| 2,852,401 | 9/1958 | Hansen et al. | 106—65 |

TOBIAS E. LEVOW, *Primary Examiner.*

J. POER, *Assistant Examiner.*